May 6, 1941.  S. J. KAYE  2,240,953
APPARATUS FOR MULLING BEVERAGES
Filed Feb. 27, 1939  3 Sheets-Sheet 1

INVENTOR.
Stanley J. Kaye
BY Harry P. Canfield
ATTORNEY.

INVENTOR.
Stanley J. Kaye
BY Harry P. Canfield
ATTORNEY.

May 6, 1941. S. J. KAYE 2,240,953
APPARATUS FOR MULLING BEVERAGES
Filed Feb. 27, 1939 3 Sheets-Sheet 3

INVENTOR.
Stanley J. Kaye
BY Harry F. Canfield
ATTORNEY.

Patented May 6, 1941

2,240,953

UNITED STATES PATENT OFFICE 2,240,953

APPARATUS FOR MULLING BEVERAGES

Stanley J. Kaye, Cleveland, Ohio

Application February 27, 1939, Serial No. 258,679

4 Claims. (Cl. 219—41)

This invention relates to methods for mulling beverages including alcoholic beverages, such as beer, ale, wine, etc., as well as non-alcoholic beverages, and to apparatus for practicing the methods.

It is well known that most beverages are more palatable and gratifying, particularly in cold weather, if served hot. Some beverages, such as coffee for example, may be heated over a flame and stored in heated condition, but beverages containing carbon dioxide, including the alcoholic beverages, quickly lose the absorbed gas and become flat if heated in this manner. The custom has been anciently practiced of heating or mulling the alcoholic beverages such as wine, ale, beer, etc., by plunging into a cup or glass containing the beverage, a red hot poker heated in an open fire. This old method, however, is not applicable at the modern bar, restaurant or soda fountain where beverages are served, and heretofore so far as I am aware no practical method or apparatus has been devised for mulling beverages conveniently, for example, with the convenience and celerity with which soft drinks are made at a soda fountain by the methods and apparatus in common use.

The primary object of this invention is therefore:

To provide an improved apparatus for mulling beverages by abruptly plunging into the beverage a heating element which has been heated to red temperature or higher, by the application thereto of an electric current, and which apparatus will be convenient to operate, and compact in arrangement, and pleasing in appearance, and suitable to be disposed for use upon a bar, soda fountain, or the like.

Other objects are:

To provide in a beverage mulling apparatus of the type referred to improved means for supporting the heating element, which provides for the plunging of the heating element into the beverage and withdrawal therefrom, by relative reciprocatory movement between the heating element and the container effected either by movement of the element or movement of the container;

To provide a beverage mulling apparatus of the type referred to having an improved heating element and means for heating it quickly and conveniently to red or higher temperature;

To provide a beverage mulling apparatus utilizing a heating element for plunging into the beverage, heated by electric current in an improved manner;

To provide in a beverage mulling apparatus of the type referred to, improved means for singly or in combination, timing the period of the heating of the heating element by electric current, and the period during which it remains in the beverage after being plunged thereinto;

To provide in a beverage mulling apparatus of the type referred to, automatic mechanism for plunging the heating element into the beverage, retaining it therein for a period of time and withdrawing it therefrom;

To provide an apparatus for mulling beverages comprising means for automatically electrically heating a heating element for a first timed period, automatically plunging it into the beverage at the end of the said period, automatically retaining it therein for a second timed period, and automatically withdrawing it therefrom at the end of the second period;

To provide an apparatus of the type referred to in the preceeding paragraph having means for automatically continuing the electric heating of the element while in the beverage;

To provide generally an improved method for mulling beverages;

To provide an improved method for mulling beverages including the utilization of an electrically heated element, heated to red hot or higher temperature, and plunged into the beverage;

To provide an improved method of mulling beverages including heating electrically, a heating element, then plunging the element into the beverage to mull it, and then withdrawing it therefrom, while timing, singly or in combination; the time period of the heating and the time period of retaining the element in the beverage;

To provide an improved method of mulling beverages such as is described in the preceding paragraph and in which heating of the element is continued after it is plunged into the beverage.

Other objects will be apparent to those skilled in the art to which my invention appertains.

My invention is fully disclosed in the following description taken in connection with the accompanying drawings, in which.

Figures 1, 2:
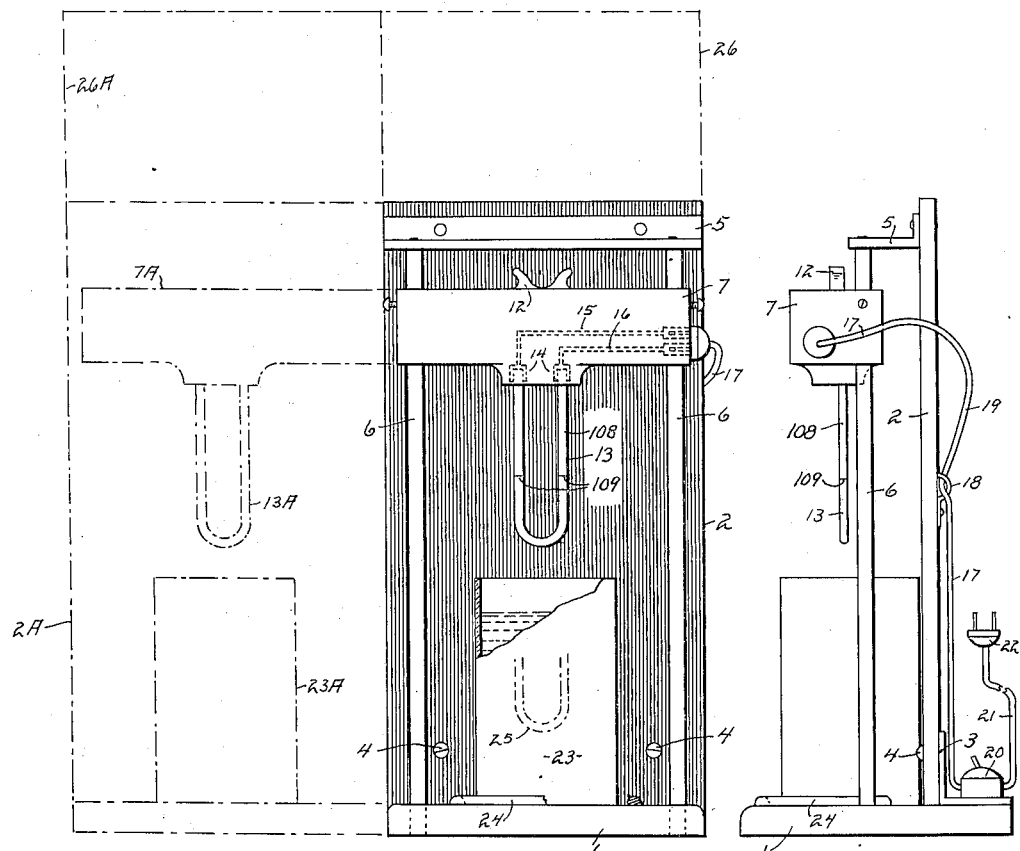
Fig. 1 is a front elevational view of an apparatus embodying my invention in one form and by which the method of my invention may be practiced, and indicating in broken line a modification thereof.
Fig. 2 is a side elevational view of the apparatus of Fig. 1.
Figure 3:
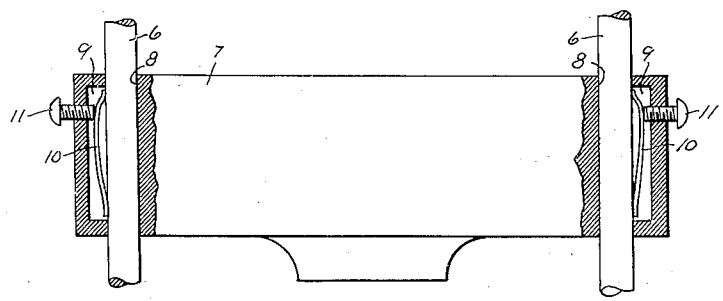
Fig. 3 is a view to an enlarged scale of a part of the apparatus of Fig. 1, the view being shown partly in cross section.

Referring to the drawings, Figs. 1, 2 and 3, I have shown at 1, a main base, and extending upwardly therefrom, a support secured to the base by the bracket 3 to which it is screwed by detachable screws 4—4. On the upper part of the support 2 is a transverse bracket 5. A pair of rods 6—6 are secured in laterally spaced parallel relation, at their upper ends to the bracket 5 and at their lower ends to the base 1. A head 7 has parallel bores 8—8 therein through which the rods 6—6 extend, and the head 7 is arranged to reciprocate vertically on the rods.

Any means may be provided to prevent the head 7 from falling by gravity from the normal upper position illustrated therefor. One such means is shown in Fig. 3. Recesses 9—9 are provided in the opposite ends of the head 7, opening into the bore 8—8 and friction elements 10—10, preferably in the forms of springs are provided, pressing upon and exerting friction upon the rods 6—6; and screws 11—11 are provided to adjustably change the amount of the friction, to cause it to support the head 7 but not to unduly interfere with movement thereof.

A handle 12 may be provided on the upper side of the head 7 by which it may be reciprocated.

At 13 is illustrated a heating element of hairpin or loop form, supported on the head 7 in suitable sockets 14—14. Electric conductors illustrated in dotted line at 15 and 16 are provided, electrically connected to a double conductor 17 and to the heating element 13. The conductor 17 is secured by an attaching device 18 to the back of the panel with a loop 19 between the head and the device 18, and beyond the device 18 the double wires thereof communicate through a switch 20 with a current supply cord 21 which may terminate in the usually double-prong connector 22, for attachment to an electric supply circuit, not shown. The loop 19 permits the conductor 17 to bend in portions above the device 18, and provides slack therein to allow the head 7 to move freely while maintaining electric connection with the element 13.

The heating element 13 may be constructed of any suitable material, one suitable form being that known commercially as Calrod. It is preferred, but not necessary, that the heating element 13 be of large diameter such as a quarter of an inch, and that its resistance be such that when electric current from the supply line passes therethrough it will in a short time bring it up to red or orange heat.

The beverage to be mulled is contained in a container 23 which, in the preferred mode of operation rests on the base 1 under the element 13, and to center it thereunder the base is provided with a bead 24, which conforms to the shape of the container and which, for the usual container which is a glass or mug, is circular.

In the preferred mode of operation of the embodiment of my invention of Fig. 1, the beverage to be mulled is placed in the container 23, and the container is placed upon the base 1, within the bead 24, the switch 20 is turned on, and electric current flows from the plug connector 22 through the heating element 13 over the circuit described, and the heating element, or the lower end portion, thereof, comes up to a red or hotter temperature.

It is to be noted that it is a feature of my invention that the heating element may be brought up to a temperature which gives it visible color, which adds to the convenience and attractiveness of the apparatus. By observing the color of the element, the operator can know when it has reached the desired temperature and timing thereof otherwise is unnecessary. Furthermore, when the apparatus is used at a bar or the like, the customer, whose beverage is to be mulled, can observe the same and can know to his own satisfaction that his beverage is being mulled by a red hot element which, as has been recognized, performs a superior mulling operation.

The element 13, having thus been heated, the operator by means of the handle 12, moves the head 7 and the element 13 therewith downwardly plunging the element into the beverage in the container 23, to any suitable depth, for example to the position 25. At this time the operator may turn off the switch 20 and discontinue the flow of current, but I have found that it is preferable to allow the current to continue to flow, the continued application of heat causing the beverage to be agitated sufficiently to heat the entire contents of the container more uniformly by the resulting convection of the liquid, than when the element is allowed to cool at once by quenching. After the element has been in the beverage for a sufficient length of time determined by experience and judgment, the head 7 is raised again by the handle 12, and if the current has not already been discontinued as referred to, it may now be cut off by operating the switch 20 to the open position. The beverage is now ready to be served.

If the operator of the device wishes to serve a succession of containers he can leave the current on continuously and after the heating element has been raised he can allow it to heat up again for another operation without interrupting the current.

Fig. 1 illustrates a simple embodiment of my invention with a single element 13, but it will be understood that the panel 2 and head 7, may be of any desired extent transversely, as indicated in broken line at 2A and 7A, and provision may be made for supporting any number of containers, another container being indicated in broken line at 23A, and correspondingly any suitable number of elements 13 may be provided on the head 7A, one other element being indicated in dotted line at 13A. When a plurality of elements are provided a corresponding plurality of containers may have the beverage therein mulled simultaneously, in which case the elements 13—13A, etc., may all be connected in parallel to the conductors 15 and 16, or may be connected in series, as will be understood by those skilled in the electrical art.

The support 2 may be extended upwardly any desired amount as at 26 or 26A, and provides space for an advertisement or pictorial representation.

The entire device may be "knocked down" to small compact dimensions by removing the screws 4—4 and detaching the support 2.

Figure 4:
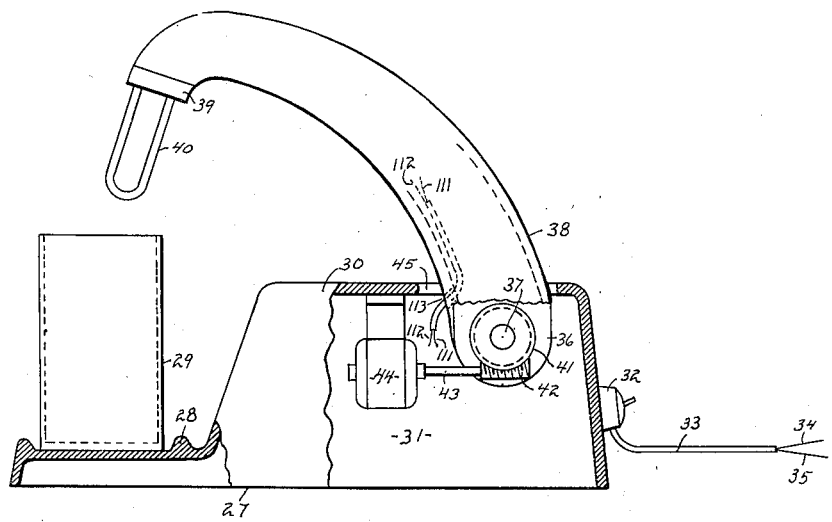
Fig. 4 is a view illustrating an embodiment of my invention in side elevation in another form.
Figure 5:
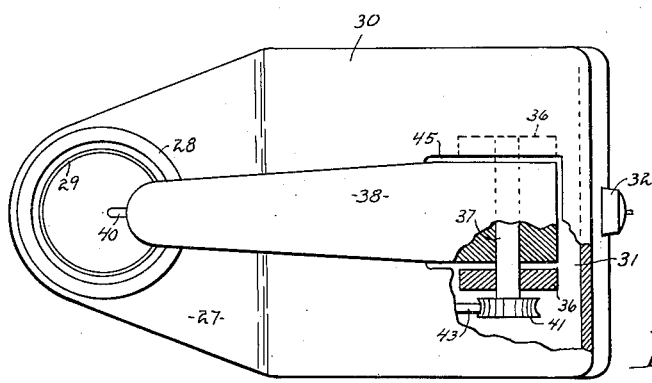
Fig. 5 is a top plan view of the embodiment of Fig. 4.
Figure 7:
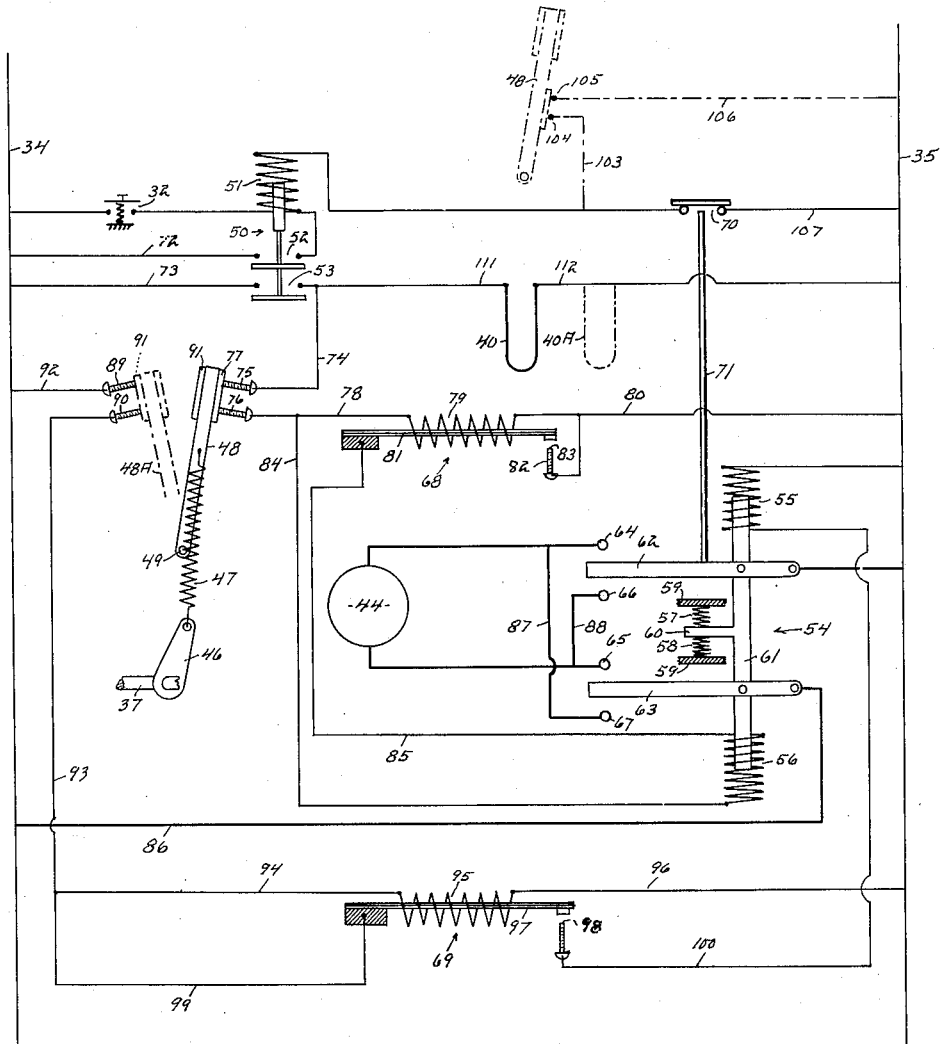
Fig. 7 is a diagrammatic view, illustrating electric circuits and apparatus which may be employed in connection with the apparatus of Figs. 4 to 6.

The embodiment of my invention of Figs. 1 to 3 may be referred to as a manually operable device to perform the method. In Figs. 4 and 5, in connection with Fig. 7, is illustrated what may be properly termed an automatic device, which will now be described.

Referring to Figs. 4 and 5, I have shown at 27 a base, which may be made from cast metal or die-cast metal or plastic material, or the like. The base 2 has thereon a circular bead 28 for supporting and positioning the beverage container 29. The rearward portion of the base has projecting upwardly therefrom, a housing 30 within or under which is a chamber 31 in which an operating and control apparatus is housed. Upon the rear of the housing is a switch 32, through which an electric current supply line 33 conducts current under control of the switch in the usual manner, the line 33, comprising wires 34 and 35.

As shown in Fig. 5, within the chamber 31 are brackets 36—36 supporting a shaft 37 having bearings in the brackets, and to which is connected for up and down movement, an arm 38. The upper or outer end of the arm 38 has mounted thereon a suitable head 39 supporting a heater 40 of loop form which may be similar to that described in connection with the form of Fig. 1. On the shaft 37 is a worm gear 41 with which is meshed a worm 42 on the shaft 43 of an electric motor 44.

The lower end of the arm 38, secured to the shaft 37, projects downwardly into the chamber 31, through an aperture 45, the aperture and the arm 38 being formed so that the arm may be swung counter-clockwise, as viewed in Fig. 4, to dispose the heating element 40 within the container 29 for the purposes described above, by rotation of the motor 44 in one direction, and withdrawn therefrom upon rotation of the motor in the other direction, the motor thus driving the arm by the worm 42, gear 41 and shaft 37, as will be understood.

Within the chamber 31 is other control apparatus for controlling the current to the heating element 40 and to the motor 44, and this apparatus and the electrical connections associated therewith are illustrated in Fig. 7. Such apparatus, which will now be described, may be of any suitable or known construction, all of which is well understood by those skilled in the electrical art, and inasmuch as this apparatus is fully illustrated in Fig. 7, it is deemed unnecessary to fully illustrate the same in Figs. 4 and 5, it being sufficient to say that all said apparatus is preferably contained within the chamber 31 and mounted upon the walls thereof and entirely covered and rendered invisible thereby, electric current being supplied thereto by the conductors 34 and 35, which are under the control of the switch 32. Some of the parts of Fig. 7 are illustrated in Fig. 4.

The arm 38 may be hollow, and a double conductor comprising wires 111 and 112 may be introduced thereinto from the chamber 31, through an aperture at 113 and connected at one end to the heating element, similar to the manner of connection more completely described for the form of Fig. 1 for the element 13.

Referring now to Fig. 7, I have reproduced the line wires 34 and 35, the switch 32, the motor 44, the shaft 37, and the heater 40. At 46 is an arm on the shaft 37 to which is connected one end of a tensioned spring 47, the other end being connected to a switch arm 48 pivotally supported at 49. The arrangement is such that upon rotating the arm 46 counter-clockwise by the shaft 37, by rotation of the motor 44 in one direction, the end of the spring 47 attached to the arm 48 will be moved sufficiently far to cause the spring to pass the pivot 49 and thereby snap the arm 48 from its position illustrated to a position illustrated in broken lines at 48A.

Illustrated generally at 50 is a relay comprising a winding 51, and two sets of contacts 52 and 53. The heating element is shown at 40. The diagram indicates, by showing another element 40A, that a plurality of elements may be employed. The wires 111 and 112 leading to and from the heating element 40 are reproduced here to identify these wires with the wires having these reference characters in Fig. 4.

The operator closes the switch 32, and this switch is preferably of the push button variety whereby, upon momentarily closing it, it will again open. Upon momentarily closing the switch 32, current flows from the main 34 through the winding 51 of the relay 50, through the closed contacts 70, to the main 35, operating the relay 50, and closing contacts 52 and 53.

The relay at once makes a maintaining circuit for itself from the main 34 by a wire 72, through the now closed contacts 52 and through the winding 51, whereby the operator may release the push button 32.

Current now flows from the main 34 by a wire 73, through the closed contacts 53 of the relay and through the heating element 40 to the main 35, and the heating element 40 begins to heat up. The switch arm 48 is in the solid line position illustrated, and therefore at the same time current flows through the contacts 53 of the relay, by a wire 74, through contacts 75 and 76 bridged by a bar 77 on the arm 48, by a wire 78, through a heating winding 79 of a thermostatic switch 68, and by wire 80 to the main 35, heating a bi-metal bar 81, of the thermostatic switch 68. The accumulation of heat in the bar 81 determines the time interval during which the heating element 40 heats up to the red temperature or higher. At the end of this period of time, which may be adjusted by a screw 82 which adjustably moves a stationary contact 83, toward or from the bar 81, the bar 81 engages the contact 83 and thereupon current flows from the main 34 through contacts 53, by wire 74, contacts 75—76, by a wire 84 through the winding 56 of a reversing contactor 54, by a wire 85 to one end of the bi-metal bar 81, through the bar to contact 83, and thence by wire 80 to the main 35. This operates the reversing contactor downwardly as viewed in the drawing moving the switch arms 62 and 63 into engagement with the contacts 66 and 67. Current then flows from the main 34 by wire 86 through the arm 63, contact 67, by wire 87 to the motor 44, thence by wire 88 to the contact 66 and by arm 62 to the main 35.

The motor 44 now starts and its direction of rotation is such that, through the mechanism described, it rotates the arm 38 counter-clockwise, as viewed in Fig. 4, projecting the element 40 into the beverage. By the time the arm 38 has moved to its down position, by rotation of the shaft 37 by the motor 44, the arm 46, Fig. 7, which is also on the shaft 37 snaps the switch arm 48 out of engagement with the contacts 75 and 76 and into engagement with contacts 89 and 90 bridging them by a bar 91. The breaking of contacts at 75—76 de-energizes the reversing contactor and the springs 58 move it to off or neutral position and the motor 44 stops.

Current to the heater 40 is not interrupted at this time, the contacts 75—76 however interrupting the current to the heating winding 79, this being the preferred arrangement.

When the contacts 89—90 close, current flows from the main 34 by a wire 92, through the contacts 89—90 by wires 93 and 94, to the heater 95 of a thermostatic switch 69, and thence by wire 96 to the main 35, heating a bi-metal bar 97 of the thermostatic switch 69, and starting another time interval, during which the heater 40 remains in the beverage.

At the end of the second time interval, the bi-metal bar 97 moves into engagement with a contact 98, which may be adjustably moved to vary the time interval similarly to the adjustment of the said contact 83, referred to above, and then the current flows from the main 34 through the contacts 89—90, by a wire 93, a wire 99, through the bar 97, and contact 98 and by wire 100, through the winding 55 of the reversing contactor, to the main 35, energizing the winding 55 and operating the reversing contactor to the up position.

Current then flows from the main 34, by wire 86, through the arm 63, contact 65, through the motor 44 to contact 64, arm 62, to the line 35, operating the motor in the reverse direction to raise the arm 38.

Movement of the arm 62 in the up direction, as described, raises the link 71 and opens the contacts at 70. This de-energizes the relay winding 51 causing the relay to open, breaking its holding circuit at 52 and breaking the circuit to the heating element 40 at 53. The winding 55, however, remains energized since it is not under control of the relay 50. Heat is now discontinued from the heating element 40, and the arm 38 moves upwardly by the action of the motor 44. By the time the arm has reached its original upper position, the arm 46 on the shaft 37 has moved the spring 47 to snap the switch arm 48 back to its solid line position, thereby breaking the current to the reversing contactor winding 55, whereupon the spring 57 restores the reversing contactor to its normal position and the motor 44 stops.

The apparatus is now in its original position ready for another operation.

It will be observed that the current to heat the element 40 is timed to permit it to come up to its desired red or higher heat; and that it is automatically moved into the beverage; and that the time during which it remains therein is timed; and that it is then automatically restored to its original position. All of these operations occur automatically after one momentary pressure of the push button switch 30.

It will also be observed that both said time intervals may be adjusted by adjusting the contacts 83 and 98.

Figure 6:
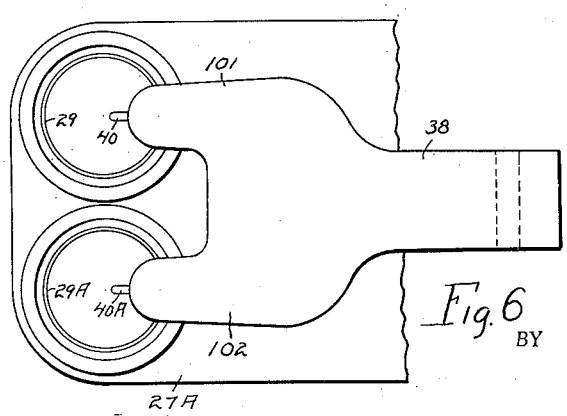
Fig. 6 is a view similar to Fig. 5 illustrating a modification.

In Fig. 6 I have illustrated a modification which indicates that the beverage in a plurality of containers may be simultaneously mulled. As shown in this figure the arm 38 is provided with two branch arms 101—102, each of which carries a heating element 40 and 40A, and the base 27A in this case, is broad enough to support two receptacles 29—29A. Similarly any desired number of heating elements may be supported and the beverage in a corresponding number of beverage containers mulled simultaneously, or with such a multiple device the beverage in only one container may be mulled at a time.

In the foregoing, it will be observed that the current and heat is maintained in the element 40 after it is plunged into the beverage. If it is desired to allow the element to be quenched and to cool off when projected into the beverage, this may readily be effected, as shown in Fig. 7, in a modification of the circuits thereof. Current flowing from the main 34 through the push button 32 and through the relay winding 51, may for this purpose, flow by an alternative circuit, including a wire 103, through contacts 104—105 bridged on the arm 48 in the clockwise position, by wire 106 to the main 35. In this case, the contacts at 70 and the wire 107 between these contacts and the line 35 would be omitted. With this arrangement, when the switch 48 snaps over to its counter-clockwise position, which occurs after the element 40 has been projected into the liquid, contact at 104—105 would be broken and the relay 50 would be restored and current would be cut off from the heating element 40. The rest of the system would operate as described above, the element 40 being withdrawn after a predetermined time interval during which its heat has been communicated to the beverage.

In connection with the form of Figs. 1 to 3, while I prefer to operate this embodiment by moving the heating element upwardly and downwardly, it will be understood that it may be operated by leaving the heating element stationary in an upper position, and raising and lowering the beverage container to thereby project the element into and out of the beverage. In connection with either mode of operation, the heating element, projects downwardly toward the container and is supplied with electric current, while being supported at a sufficient elevation to permit the container to be placed thereunder, and, after said reciprocation, to be withdrawn and removed laterally from under the heating element.

In either the form of Fig. 1 or of Fig. 4, the heating element heats, as is well known, because of its electrical resistance by the $C^2R$ effect. The entire element below the head may be of sufficient resistance to heat from end to end; or if preferred, only the lower end portion which is immersed in the beverage may be heated and to this end the upper portion of the heater may be in the form of low-resistance rods, 108—108, for example of copper, and connected to the high resistance loop portion at the juncture indicated by the line 109—109.

My invention is not limited to the details of construction illustrated and described. Changes and modifications may be made within the spirit of my invention without sacrificing its advantages and within the scope of the appended claims.

I claim:

1. In a beverage mulling apparatus, a main base formed to rest upon a bar or the like, a head reciprocably supported on the frame and carrying a downwardly projected electrical resistance heating element at sufficient elevation to permit a beverage container to be moved laterally to dispose it under and remove it from under the element, power means to reciprocate the head to move the element downwardly and upwardly, an electric circuit to heat the element, and means to time the heating current.

2. In a beverage mulling apparatus, a main base formed to rest on a bar or the like, a head reciprocably supported on the frame and carrying a downwardly projected electrical resistance heating element at sufficient elevation to permit a beverage container to be moved laterally to dispose it under and to remove it from under the element, means to time a time period, and power means to reciprocate the head to move the element downwardly at the end of the time period, 3. In a beverage mulling apparatus, a main base formed to rest on a bar or the like, a head reciprocably supported on the frame and carrying a downwardly projected electrical resistance heating element at sufficient elevation to permit a beverage container to be moved laterally to dispose it under and to remove it from under the element, means to time a time period, power means to reciprocate the head to move the element downwardly at the end of the time period, means to time a second time period during which the element remains in the downward position and means to cause the power means to automatically return the head upwardly after the termination of the second time period.

4. In a beverage mulling apparatus, a main base formed to rest on a bar or the like, a head reciprocably supported on the frame and carrying a downwardly projected electrical resistance heating element at sufficient elevation to permit a beverage container to be moved laterally to dispose it under and to remove it from under the element, an electric circuit for heating the heating element, means to time a time period during which the circuit is closed to heat the heating element, power means to reciprocate the head to move the element downwardly at the end of the time period, means to time a second time period during which the element remains in the downward position, means to cause the power means to automatically return the head upwardly at the end of the second time period, and means to automatically interrupt the heating current after the termination of the second time period.

STANLEY J. KAYE.